United States Patent
Sasaki et al.

[11] Patent Number: 6,046,517
[45] Date of Patent: *Apr. 4, 2000

[54] ELECTRIC MOTOR

[75] Inventors: Toyoshige Sasaki, Yokohama; Chikara Aoshima, Zama, both of Japan

[73] Assignee: Canon Kabushiki Kaisha, Tokyo, Japan

[ * ] Notice: This patent is subject to a terminal disclaimer.

[21] Appl. No.: 09/111,786

[22] Filed: Jul. 8, 1998

[30] Foreign Application Priority Data

Jul. 17, 1997 [JP] Japan ................................ 9-208560

[51] Int. Cl.$^7$ .................................................. H02K 37/10
[52] U.S. Cl. .................................. 310/40 MM; 310/254; 310/257; 310/266
[58] Field of Search .......................... 310/40 MM, 254, 310/257, 156, 261, 266

[56] References Cited

U.S. PATENT DOCUMENTS

| | | | |
|---|---|---|---|
| 4,296,341 | 10/1981 | Guttinger | 310/41 |
| 4,381,465 | 4/1983 | Renkl et al. | 310/49 R |
| 4,754,183 | 6/1988 | Gerber | 310/156 |
| 4,823,038 | 4/1989 | Mizutani et al. | 310/257 |
| 4,987,329 | 1/1991 | Schmidt et al. | 310/156 |
| 5,384,506 | 1/1995 | Aoshima | 310/49 R |
| 5,410,200 | 4/1995 | Sakamoto et al. | 310/49 R |
| 5,831,356 | 11/1998 | Aoshima | 310/49 R |

FOREIGN PATENT DOCUMENTS

| | | |
|---|---|---|
| 0 801 459 | 10/1997 | European Pat. Off. . |
| 0 851 560 | 7/1998 | European Pat. Off. . |
| 44 23 952 | 1/1995 | Germany . |
| 3-180823 | 6/1991 | Japan . |
| 409289767 | 11/1997 | Japan . |

OTHER PUBLICATIONS

Patent Abstracts of Japan, vol. 10, No. 319, Oct. 30, 1986.
Patent Abstracts of Japan, vol. 010, No. 319, Oct 30, 1986.
Patent Abstracts of Japan, vol. 014, No. 537, Nov. 27, 1990.
Patent Abstracts of Japan, vol. 015, No. 433, Nov. 5, 1991.
Patent Abstracts of Japan, vol. 011, No. 338, Nov. 5, 1987.

*Primary Examiner*—Nestor Ramirez
*Assistant Examiner*—Joseph Waks
*Attorney, Agent, or Firm*—Fitzpatrick, Cella, Harper & Scinto

[57] ABSTRACT

An electrical motor includes a cylindrical magnet divided into n regions circularly around at least an outer circumference thereof that are magnetized in alternate polarities. The motor also includes first and second coils arranged in an axial direction of the magnet. The magnet is interposed between the first and second coils. The motor further includes first and second external portions excitable by current flowing through the first and second coils, respectively, so that these portions become first and second external magnetic poles, respectively. The first and second external portions face the outer circumference of the magnet at one side and the other side thereof, respectively. The area of the first and second external portions facing the outer circumference of the first and second coils, respectively, is equal to or smaller than three-quarters of the area of the outer circumference of the first and second coils, respectively. The motor also includes first and second internal portions excitable by current flowing through the first and second coils, respectively, to cause these portions to become first and second internal magnetic poles, respectively. The first and second internal portions face the internal circumference of the magnet on the one and the other sides of the magnet, respectively.

11 Claims, 13 Drawing Sheets

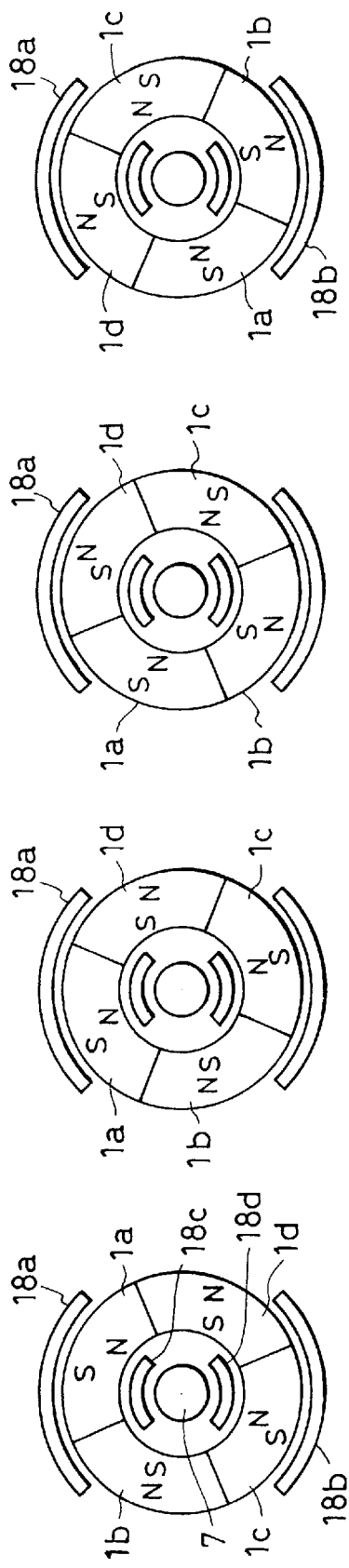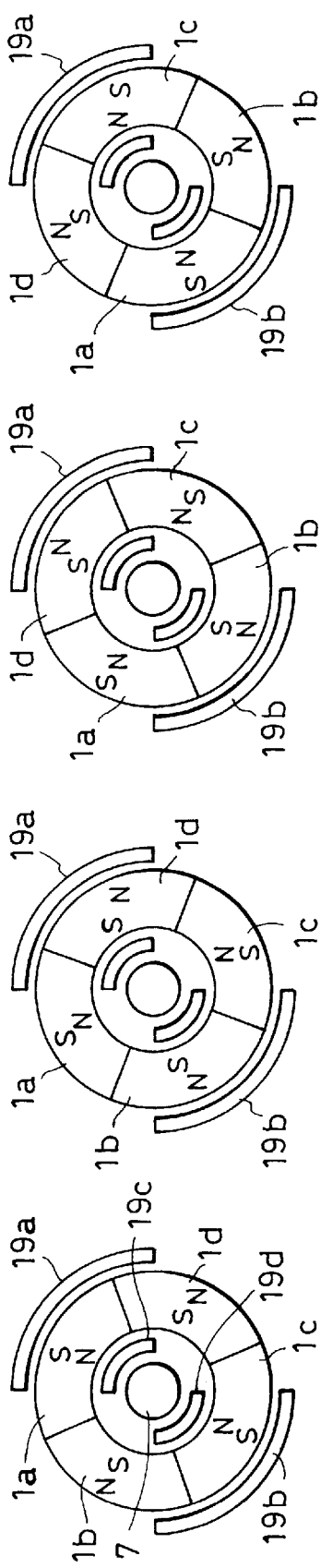

ELECTRIC MOTOR

BACKGROUND OF THE INVENTION

1. Field of the Invention

The present invention relates to a miniature electric motor in which the area of a stator is defined in relation to a coil.

2. Description of the Related Art

FIG. 13 shows a cylindrical stepping motor that is currently available as a miniature motor. Stator coils 105 are coaxially wound around respective bobbins 101, and the bobbins 101 are clamped in the direction of the axis of the motor by two stator yokes 106. The stator yokes 106 have respectively stator teeth 106a and stator teeth 106b arranged alternately circularly around the inner circumferences of the bobbins 101. The stator yokes 106 integrally formed with the stator teeth 106a and 106b are fixed to a pair of cases 103, constructing a stator 102.

One of the pair of cases 103 supports a flange 115 and one bearing 108, and the other of the pair of cases 103 supports the other bearing 108. A rotor 109 includes a rotor magnet 111 fixed on a rotor shaft 110, and there is a radial air gap between the rotor magnet 111 and the stator yoke 106a of the stator 102. The rotor shaft 110 is rotatably supported by two bearings 108. The miniature stepping motor thus constructed for driving a camera lens is disclosed in Japanese Patent Laid-Open No. 3-180823.

Since the above conventional miniature stepping motor includes the cases 103, bobbins 101, stator coils 105, stator yokes 106 and the like coaxially arranged surrounding the rotor, the size of the motor becomes large. The magnetic flux generated with the stator coils 105 conducting currents chiefly passes the end face 106a1 of the stator tooth 106a and the end face 106b1 of the stator tooth 106b, as shown in FIG. 14. The magnetic flux are thus unable to efficiently act on the rotor magnet 111, failing to result in a high motor output power.

U.S. patent application Ser. No. 08/831,863 which is assigned to the assignee of the present invention discloses a technique that resolves this problem.

The motor proposed in the above applications includes a cylindrical rotor composed of a permanent magnet that is magnetized in alternate polarities equally and circularly spaced around, a first coil, a rotor and a second coil in the direction of the rotor. A first external magnetic pole and a first internal magnetic pole, both excited by the first coil, are arranged to face the outer circumference and the inner circumference of the rotor, respectively, and a second external magnetic pole and a second internal magnetic pole, both excited by the second coil, are arranged to face respectively the outer circumference and the inner circumference of the rotor. A rotating shaft is projected out of the cylindrical permanent magnet.

Such a motor has reduced external dimensions and provides high output power. However, the small radial dimension of the internal magnetic poles presents difficulty machining toothed poles. Furthermore, a need exists for a motor of a small radial dimension that provides a reliable output with a small runout.

U.S. patent application Ser. No. 08/994,994, which is assigned to the assignee of the present invention discloses a motor having an internal magnetic pole which is easy to machine. Furthermore, U.S. patent application Ser. No. 09/22474 which is assigned to the assignee of the present invention discloses a motor having a rotor which provides a reliable output with a small runout and in which transmission means, such as a gear and a pulley, is easily mounted to a rotating shaft of a small radial dimension.

There is a need for a miniature and high-performance motor that takes advantage of a relationship between a coil and a stator.

SUMMARY OF THE INVENTION

Accordingly, it is an object of the present invention to devise a stator that contributes to the design of a miniature and high-performance motor.

It is yet another object of the present invention to determine the area of an external magnetic pole based on the outer circumference area of a coil.

According to one aspect, the present invention which achieves these objectives relates to an electric motor comprising a cylindrical magnet, first and second coils, first and second external portions, and first and second internal portions. The cylindrical magnet is divided Into n regions circularly around at least an outer circumference of the magnet that are magnetized in alternate polarities. The first coil and the second coil are arranged in the axial direction of the magnet and the magnet is interposed between the first coil and the second coil. The first external portion is excitable by current flowing through the first coil to become a first external magnetic pole. The first external portion faces the outer circumference of the magnet at one side of the magnet. The area of the first external portion facing the outer circumference of the first coil is equal to or smaller than three-fourths of the area of the outer circumferential surface of the first coil. The first internal portion is excitable by current flowing through the first coil to become a first internal magnetic pole. The first internal portion faces the inner circumference of the magnet at the one side of the magnet. The second external portion is excitable by current flowing through the second coil to become a second external magnetic pole. The second external portion faces the outer circumference of the magnet at the other side of the magnet. The area of the second external portion facing the outer circumference of the second coil is equal to or smaller than three-fourths of the area of the outer circumferential surface of the second coil. The second internal portion is excitable by current flowing through the second coil to become a second internal magnetic pole. The second internal portion faces the inner circumference of the magnet at the other side of the magnet.

The motor can further comprise a rotating shaft rigidly connected to the magnet. In this case the magnet and the rotating shaft together comprise a rotor. In addition, the rotating shaft is made of a magnetically soft material. Also, the widths of the first external portion and the second external portion widen as the first external portion and the second external portion run toward base portions thereof. The first external portion and the first internal portion together comprise a first stator, and the second external portion and the second internal portion together comprise a second stator. In addition, the motor further comprises a cylindrical linking member connecting the first external portion to the second external portion. The magnet is divided into n regions circularly around an inner circumference thereof that are magnetized in alternate polarities. Each region on the inner circumference is magnetized in a polarity opposite to the polarity of the corresponding region on the outer circumference of the magnet.

According to another aspect, the present invention which achieve these objects relates to an electric motor comprising a cylindrical magnet, first and second coils, first and second external portions, first and second external base portions, first and second internal portions, and first and second junction portions. The cylindrical magnet is divided into n regions circularly around at least an outer circumference of the magnet that are magnetized in alternate polarities. The first coil and the second coil are arranged in the axial direction of the magnet and the magnet is interposed between the first coil and the second coil. The first external portion comprises a first external end portion excitable by a current flowing through the first coil to become a first external magnetic pole. The first external magnetic pole faces the outer circumference of the magnet at one side thereof. The first external base portion is a base portion of the first end portion. The first internal portion comprises a first internal end portion excitable by a current flowing through the first coil to become a first internal magnetic pole. The first internal magnetic pole faces the inner circumference of the magnet at the one side of the magnet. The first junction portion joins the first external and internal portions. The second external portion comprises a second external end portion excitable by a current flowing through the second coil to become a second external magnetic pole. The second external magnetic pole faces the outer circumference of the magnet at the other side of the magnet. The second external base portion is a base portion of the second end portion. The second internal portion comprises a second internal end portion excitable by a current flowing through the second coil to become a second internal magnetic pole. The second internal magnetic pole faces the inner circumference of the magnet at the other side of the magnet. The second junction portion joins the second external and internal portions. The first external base portion is positioned between the center of the first coil and the first junction portion opposite to the magnet in the axial direction of the magnet. The second external base portion is positioned between the center of the second coil and the second junction portion opposite to the magnet in the axial direction of the magnet.

According to another aspect, the invention which achieves these objectives relates to an electric motor comprising a cylindrical magnet, first and second coils, first and second external portions, first and second external base portions, and first and second internal portions. The cylindrical magnet is divided into n regions circularly around at least an outer circumference of the magnet that are magnetized in alternate polarities. The first coil and the second coil are arranged in the axial direction of the magnet and the magnet is interposed between the first coil and the second coil. The first external portion comprises a first external end portion excitable by a current flowing through the first coil to become a first external magnetic pole. The first external magnetic pole faces the outer circumference of the magnet at one side of the magnet. The first external base portion is a base portion of the first end portion. The first internal portion comprises a first internal end portion excitable by a current flowing through the first coil to become a first internal magnetic pole. The first internal magnetic pole faces the inner circumference of the magnet at the one side of the magnet. The second external portion comprises a second external end portion excitable by a current flowing through the second coil to become a second external magnetic pole. The second external magnetic pole faces the outer circumference of the magnet at the other side of the magnet. The second external base portion is a base portion of the second end portion. The second internal portion comprises a second internal end portion excitable by a current flowing through the second coil to become a second internal magnetic pole. The second internal magnetic pole faces the inner circumference of the magnet at the other side of the magnet. The first external base portion is positioned between the center of the first coil and the end of the first coil opposite to the magnet in the axial direction of the magnet. The second external base portion is positioned between the center of the second coil and the end of the second coil opposite to the magnet in the axial direction of the magnet.

According to still another aspect, the invention which achieves these objectives relates to an electric motor comprising a cylindrical magnet, first and second coils, first and second external portions, and first and second internal portions. The cylindrical magnet is divided into n regions circularly around at least an outer circumference of the magnet that are magnetized in alternate polarities. The first coil and the second coil are arranged in the axial direction of the magnet. The magnet is interposed between the first coil and the second coil. The first external portion is excitable by a current flowing through the first coil to become a first external magnetic pole. The first external portion faces the outer circumference of the magnet at one side of the magnet. The area of the first external portion facing the outer circumference of the first coil is equal to or smaller than three-fourths of the area of the outer circumferential surface of the first coil. The first internal portion is excitable by a current flowing through the first coil to become a first internal magnetic pole. The first internal portion faces the inner circumference of the magnet at the one side of the magnet. The first external and internal portions together comprise a first stator. The second external portion is excitable by a current flowing through the second coil to become a second external magnetic pole. The second external portion faces the outer circumference of the magnet at the other side of the magnet. The area of the second external portion facing the outer circumference of the second coil is equal to or smaller than three-fourths of the area of the outer circumferential surface of the second coil. The second internal portion is excitable by a current flowing through the second coil to become a second internal magnetic pole. The second internal portion faces the inner circumference of the magnet at the other side of the magnet. The second internal and external portions together comprise a second stator.

The first stator is integrally formed of the first external portion and the first internal portion, and the second stator is integrally formed of the second external portion and the second internal portion. In addition, the motor can further comprise a rotating shaft rigidly connected to the magnet. In this case, the magnet and the rotating shaft together comprise a rotor, and the rotating shaft is made of a magnetically soft material. Also, the widths of the first external portion and the second external portion widen as the first external portion and the second external portion run toward the base portions thereof.

Other objects of the present invention will be apparent from the description of the following embodiments.

BRIEF DESCRIPTION OF THE DRAWINGS

FIGS. 4A–4H show the rotation operation of the rotor of the motor of FIG. 3;

DESCRIPTION OF THE PREFERRED EMBODIMENTS

Figure 1:
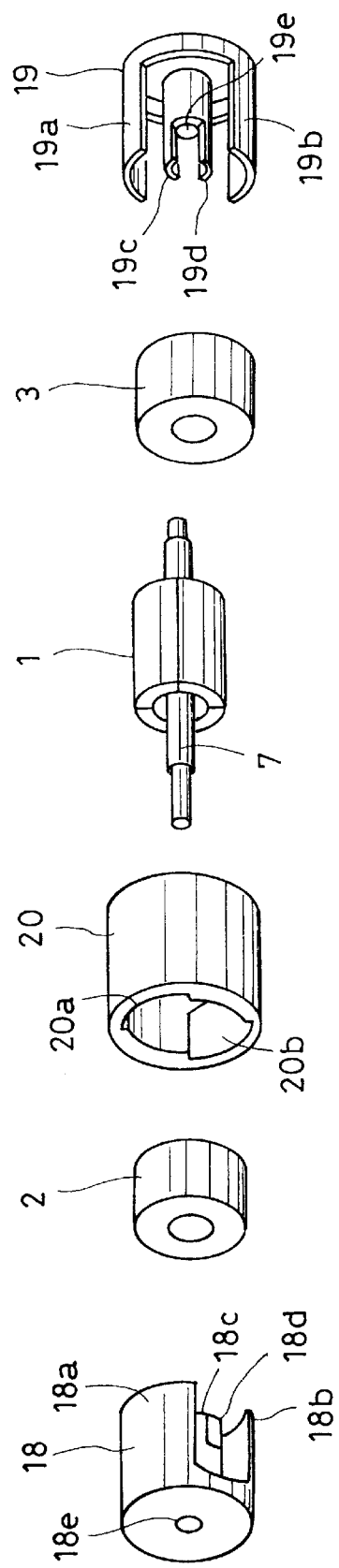
FIG. 1 is an exploded, perspective view showing a motor of a first embodiment of the present invention.

Referring to the drawings, the present invention is now discussed.

Figure 2:
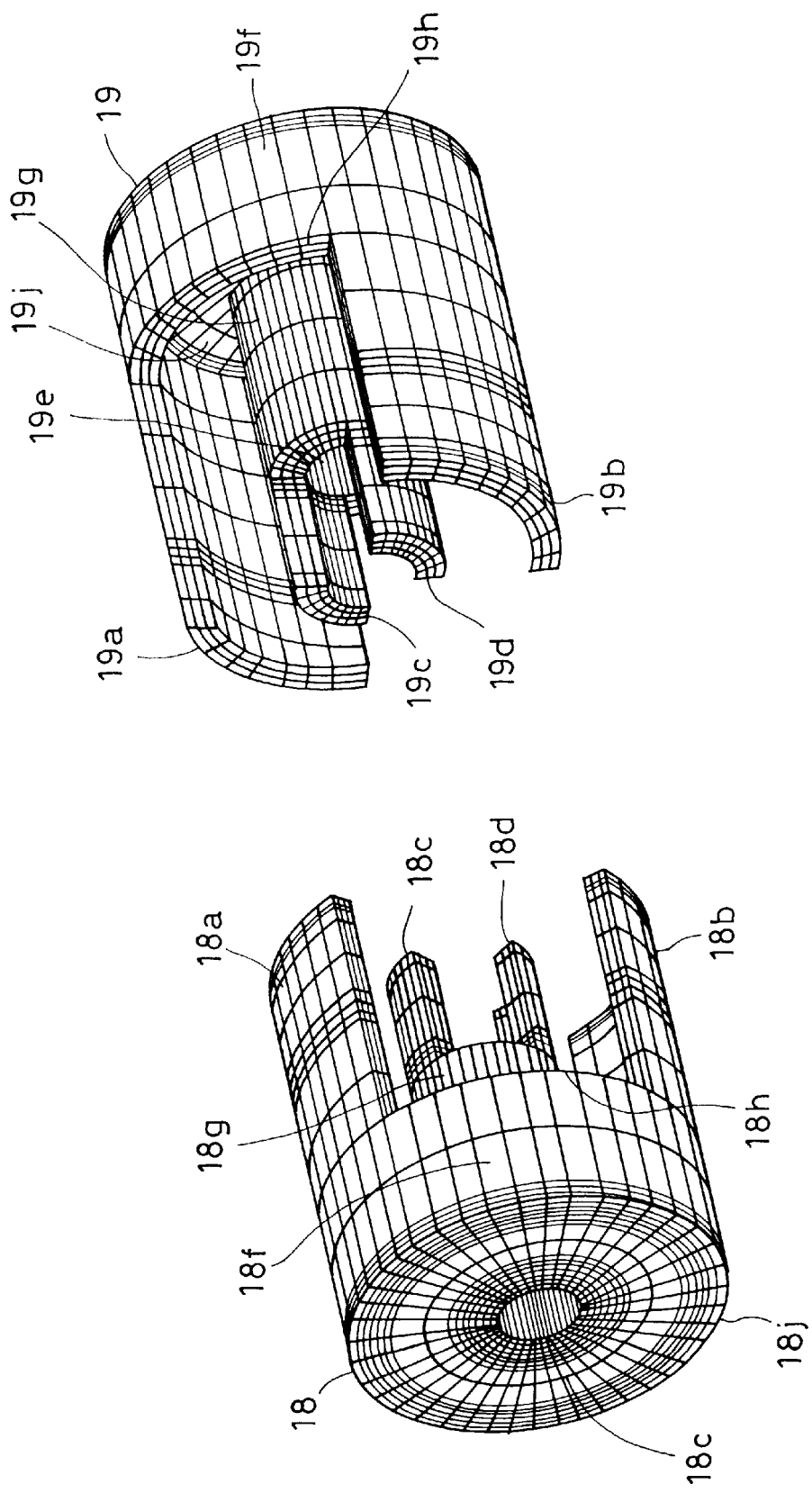
FIG. 2 is an enlarged, perspective view of the stator of the motor shown in FIG. 1.
Figure 3:
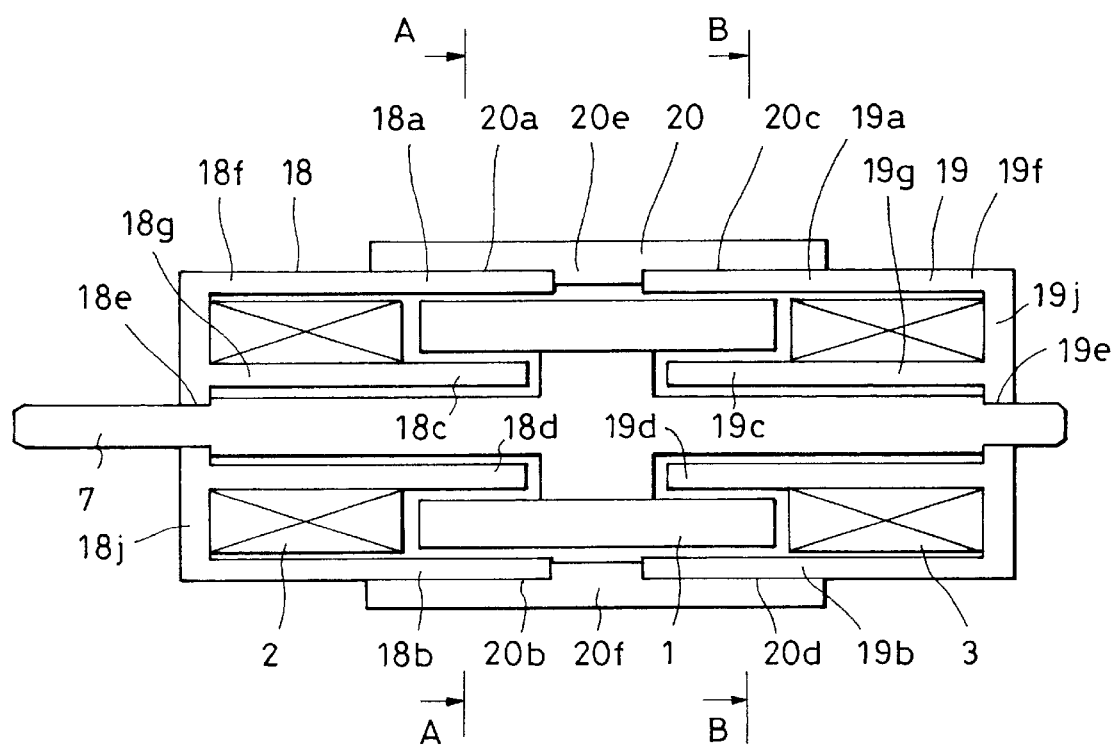
FIG. 3 is a sectional view showing the motor of FIG. 1 when it is being assembled.

FIG. 1 through FIG. 4 show a stepping motor of a first embodiment of the present invention. FIG. 1 is an exploded, perspective view showing the stepping motor, FIG. 2 is an enlarged view of the mutually facing stators of the motor, FIG. 3 is a sectional view showing the motor when it is assembled, and FIGS. 4A–4H are cross-sectional views of the motor taken along lines A—A and B—B.

Referring to FIGS. 1 through 4H, a cylindrical magnet 1 constituting a rotor is divided by n (4 in this embodiment) circularly around its outer circumference and magnetized in alternate polarities of S and N poles to form magnetized regions 1a, 1b, 1c and 1d. Magnetized regions 1a and 1c are S poles, while magnetized regions 1b and 1d are N poles. The inner circumference of the magnet 1 is magnetized in opposite polarity to its opposed outer circumference. Thus, for example, the inner circumferences of the magnetized regions 1a and 1c are N poles while the inner circumferences of the magnetized regions 1b and 1d are S poles. An output shaft 7 is a rotor shaft. The output shaft 7 is rigidly connected to the magnet 1. The output shaft 7 and magnet 1 constitute the rotor. Cylindrical coils 2 and 3 are collinear with the magnet 1, and keep the magnet 1 therebetween in the direction of its axis. The coils 2 and 3 have an outer diameter approximately equal to that of the magnet 1.

A first stator 18 and a second stator 19 are made of a magnetically soft material. The first stator 18 and second stator 19 are arranged with a difference of 180°/n, namely 45° introduced therebetween in this embodiment. Each of the first stator 18 and second stator 19 is constructed of an internal cylinder and an external cylinder. The coil 2 is arranged between the internal cylinder and external cylinder of the first stator 18. With a current flowing through the coil 2, the first stator 18 is excited.

FIG. 2 is an enlarged perspective view of the first stator 18 and second stator 19. The first stator 18 has on the ends of its external cylinder and internal cylinder, external magnetic poles 18a and 18b and internal magnetic poles 18c and 18d, respectively. The internal magnetic poles 18c and 18d are shifted 360°/(n/2) off, namely 180° off from each other so that the internal magnetic poles 18c and 18d are in phase. The internal magnetic pole 18c faces the external magnetic pole 18a while the internal magnetic pole 18d faces the external magnetic pole 18b. The cylinder portions of the external cylinder and internal cylinder of the first stator are referred to as an external cylinder portion 18f and an internal cylinder portion 18g, respectively, the end portions of the external cylinder portion 18f close to the magnet 1 are referred to as an external cylinder end portion 18h, and the portion connecting the internal cylinder portion 18g to the external cylinder portion 18f is referred to as a junction portion 18j of the internal and external cylinder portions. Portion 18h can be considered a base portion of external magnetic poles 18a and 18b.

Referring to FIG. 1, the first stator 18 is assembled such that the external magnetic poles 18a and 18b face the outer circumference of the magnet 1 and the internal magnetic poles 18c and 18d face the inner circumference of the magnet 1 in such a manner that one side of the magnet 1 is interposed between the external magnetic poles 18a and 18b and the internal magnetic poles 18c and 18d. One end of the output shaft 7 is put into rotatable engagement within a hole 18e of the first stator 18.

The coil 3 is arranged between the internal cylinder and external cylinder of the second stator 19. With a current flowing through the coil 3, the second stator 19 is excited. As shown in FIG. 2, the second stator 19 has on the ends of its external cylinder and internal cylinder, external magnetic poles 19a and 19b and internal magnetic poles 19c and 19d, respectively. The internal magnetic poles 19c and 19d are shifted 360°/(n/2) off, namely 180° off from each other so that the internal magnetic poles 19c and 19d are in phase. The internal magnetic pole 19c faces the external magnetic pole 19a while the internal magnetic pole 19d faces the external magnetic pole 19b. The cylinder portions of the external cylinder and internal cylinder of the second stator are referred to as an external cylinder portion 19f and an internal cylinder portion 19g, respectively, the end portions of the external cylinder 19f close to the magnet 1 are referred to as an external cylinder end portion 19h, and the portion connecting the internal cylinder portion 19g to the external cylinder portion 18f is referred to as a junction portion 19j of the internal and external cylinder portions. Portion 19h can be considered a base portion of external magnetic poles 19a and 19b.

Referring to FIG. 1, the second stator 19 is assembled such that the external magnetic poles 19a and 19b face the outer circumference of the magnet 1 and the internal magnetic poles 19c and 19d face the inner circumference of the magnet 1 in such a manner that one end of the magnet 1 is interposed between the external magnetic poles 19a and 19b and the internal magnetic poles 19c and 19d. The other end of the output shaft 7 is put into rotatable engagement within a hole 19e of the second stator 19. With this arrangement, the magnetic flux generated by the coil 2 crosses the magnet 1 as the rotor interposed between the external magnetic poles 18a and 18b and the internal magnetic poles 18c and 18d, and efficiently acts on the magnet 1 and the magnetic flux generated by the coil 3 crosses the magnet 1 interposed between the external magnetic poles 19a and 19b and the internal magnetic poles 19c and 19d, and efficiently acts on the magnet 1 as the rotor. The output power of the motor is thus increased.

A linking ring 20, in the shape of a cylindrical member and constructed of a non-magnetic material, has, on one end portion of its inner circumference, slots 20a and 20b, and on the other end portion of its inner circumference, slots 20c and 20d positioned 45° off, respectively, from the slots 20a and 20b. The external magnetic poles 18a and 18b of the first stator 18 are engaged with the slots 20a and 20b, respectively, and the external magnetic poles 19a and 19b of the second stator 19 are engaged with the slots 20c and 20d, respectively. An adhesive is applied to the engaged areas between the linking ring 20 and the first and second stators 19 and 20 to assemble them. The first stator 18 and second stator 19 are arranged within the linking ring 20 so that the external magnetic poles 18a and 18b face the external magnetic poles 19a and 19b, respectively, with projected areas 20e and 20f in the inner circumference of the linking ring 20 allowing a predetermined spacing therebetween, while the internal magnetic poles 18c and 18d face the internal magnetic poles 19c and 19d with a predetermined spacing therebetween.

FIG. 3 is a sectional view of the stepping motor, FIGS. 4A through 4D are cross-sectional views taken along a line A—A in FIG. 3, and FIGS. 4E through 4H are cross-sectional views taken along a line B—B in FIG. 3. FIGS. 4A and 4E show one state of the motor at the same moment of operation, FIGS. 4B and 4F show yet another state of the motor at the same moment, FIGS. 4C and 4G show yet another state of the motor at the same moment, and FIGS. 4D and 4H show yet another state of the motor at the same moment.

The operation of the stepping motor of the present invention is now discussed. At the state shown in FIGS. 4A and 4E, with currents flowing through the coils 2 and 3, the external magnetic poles 18a and 18b of the first stator 18 are magnetized to be N poles, and the internal magnetic poles 18c and 18d are magnetized to be S poles, the external magnetic poles 19a and 19b of the second stator 19 are magnetized to be S poles and the internal magnetic poles 19c and 19d are magnetized to be N poles. The magnet 1 of the rotor rotates counterclockwise by 45° to the state shown in FIGS. 4B and 4F.

With the current flowing through the coil 2 reversed, the external magnetic poles 18a and 18b of the first stator 18 are magnetized to be S poles, and the internal magnetic poles 18c and 18d are magnetized to be N poles, the external magnetic poles 19a and 19b of the second stator 19 are magnetized to be S poles and the internal magnetic poles 19c and 19d are magnetized to be N poles. The magnet 1 of the rotor rotates further counterclockwise by 45° to the state shown in FIGS. 4C and 4G.

With the current flowing through the coil 3 reversed, the external magnetic poles 19a and 19b of the second stator 19 are magnetized to be N poles, the internal magnetic poles 19c and 19d are magnetized to be S poles, the external magnetic poles 18a and 18b of the first stator 18 are magnetized to be S poles, and the internal magnetic poles 18c and 18d are magnetized to be N poles. The magnet 1 of the rotor rotates further counterclockwise by 45° to the state shown in FIGS. 4D and 4H. The direction of current conduction to the coils 2 and 3 is thus alternated, and the magnet 1 of the rotor rotates to the position in accordance with the phase of the currents conducted.

In the motor thus constructed, the output shaft 7 is preferably made of a magnetically soft material to obtain a large torque. To satisfy torque and robustness requirements at the same time, the external cylinder end portions 18h are preferably placed to the side of the junction portion 18j of the internal and external cylinder portions with respect to the center of the coil in the direction of the rotor shaft. The external cylinder end portions 19h of the second stator 19 are preferably placed to the side of the internal and external cylinder junction portion 19j of the internal and external cylinder portions with respect to the center of the coil. A further description on this arrangement is will provided referring to FIGS. 5 through 11.

Figure 5:
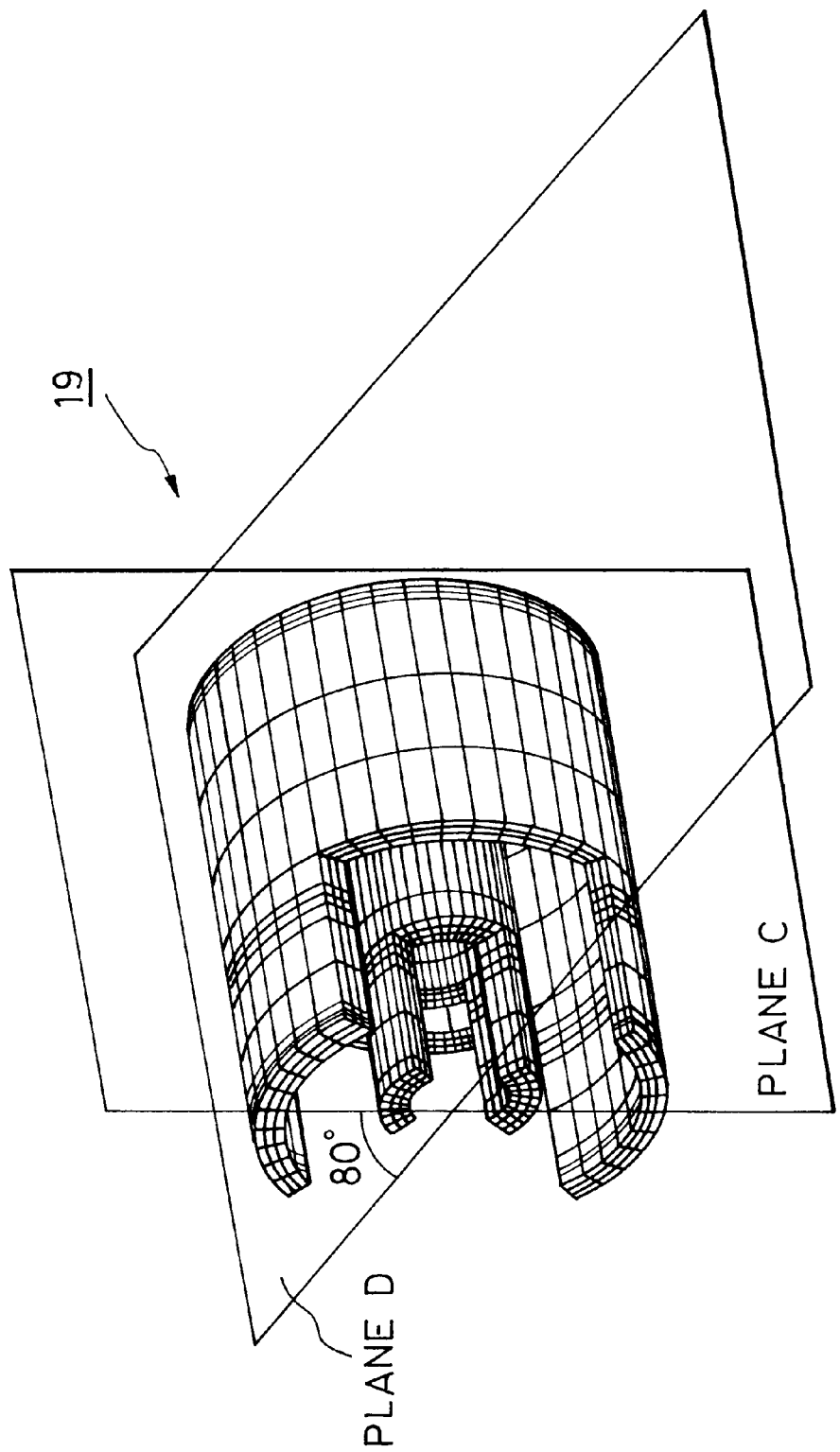
FIG. 5 is an enlarged, perspective view of one stator of the motor of FIG. 1.
Figure 6:
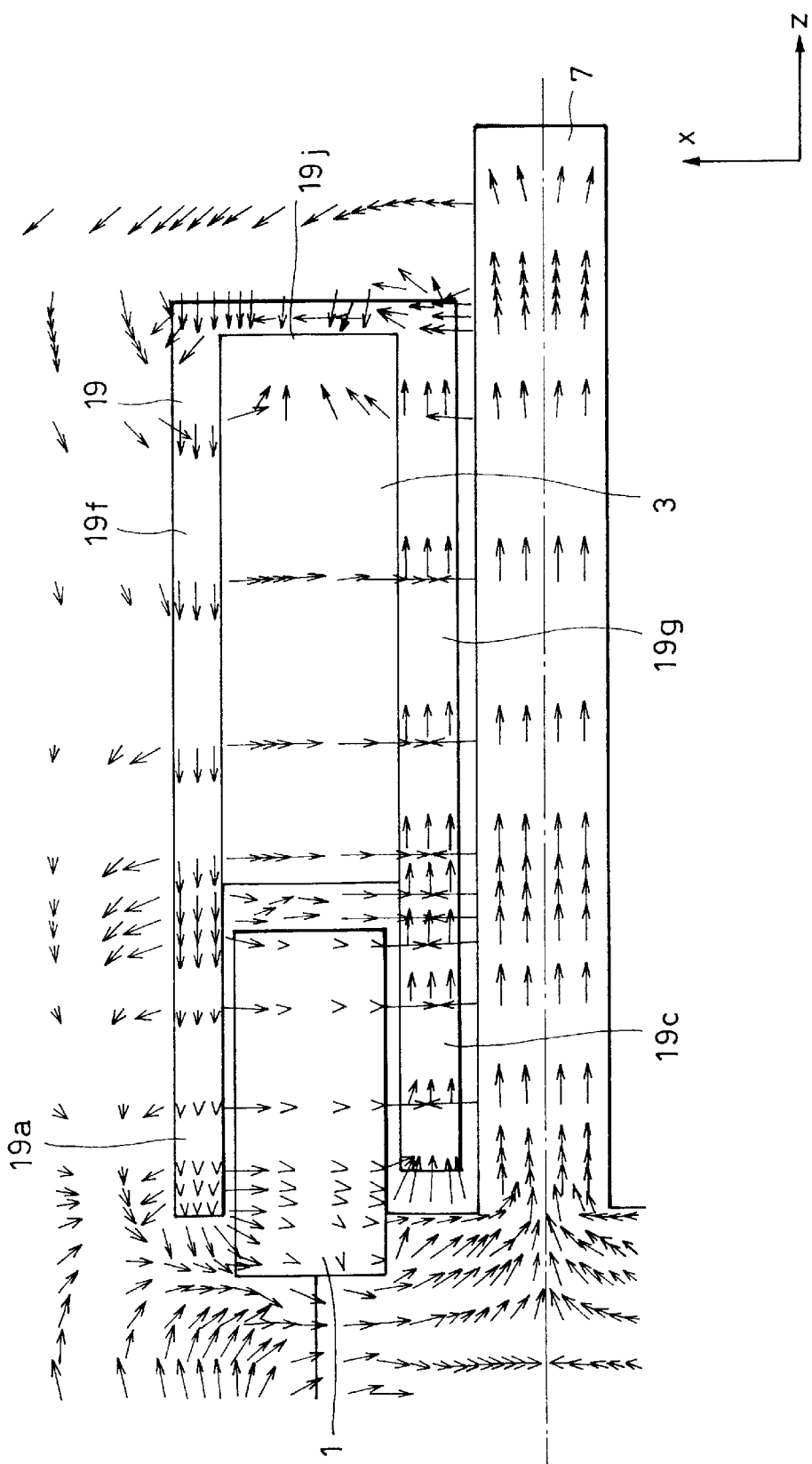
FIG. 6 shows the distribution of the magnetic field of the motor in a plane C of the stator shown in FIG. 5.
Figure 7:
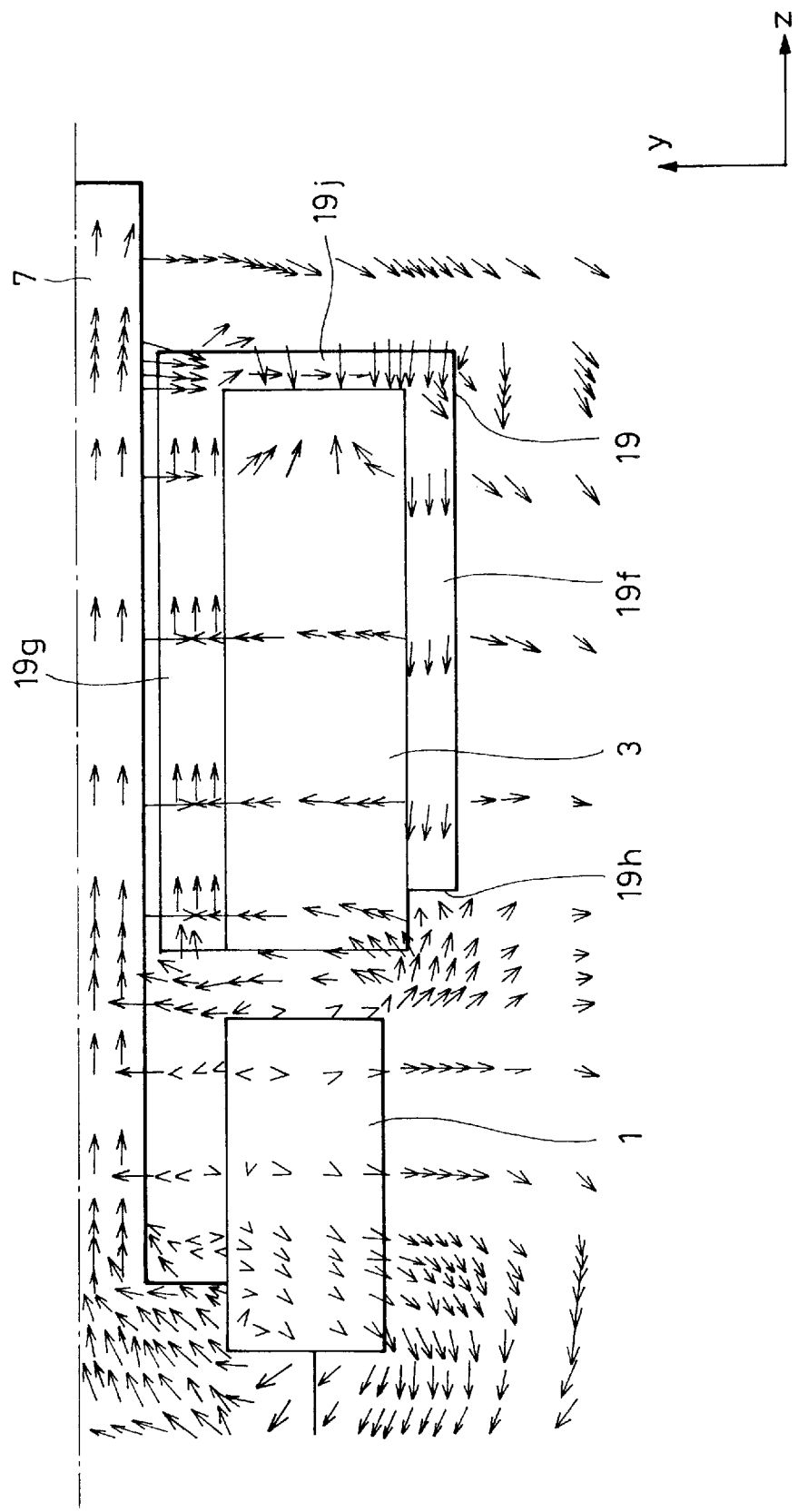
FIG. 7 shows the distribution of the magnetic field of the motor in a plane D of the stator shown in FIG. 5.
Figure 8:
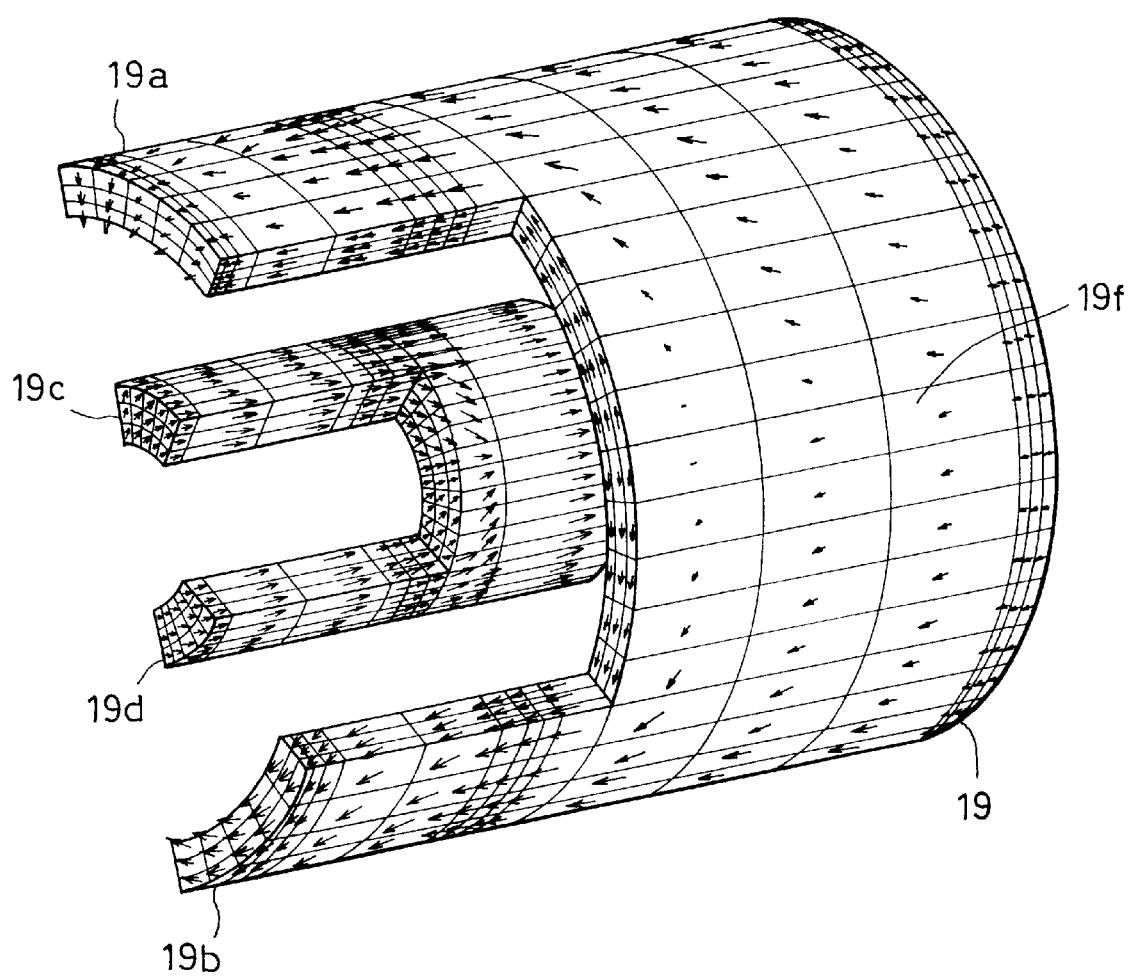
FIG. 8 shows the distribution of the magnetic field in the other stator of the motor shown in FIG. 1.

FIGS. 5 through 8 show the distribution of the magnetic field of the second stator 19 in sectional and perspective views. FIG. 5 is the perspective view of the second stator 19 showing where sectional views in FIGS. 6 and 7 are taken. FIG. 6 is the sectional view taken along a plane C in which the central axis of the rotor, and the longitudinal center lines of the external magnetic poles 19a and 19b and of the internal magnetic poles 19c and 19d of the second stator 19 lie. FIG. 7 is the sectional view taken along a plane D which is angularly apart about the central axis of the rotor by 80° from the plane C. Since the distribution of the magnetic field is symmetrical with respect to the central axis of the rotor in both planes, the distribution of the magnetic field on one side of the rotor only with respect to its central axis is shown. FIG. 8 shows the distribution of the magnetic field drawn on the perspective view of the second stator 19, and half the stator only is shown because the distribution of the magnetic field is symmetrical in the second stator 19.

As can be seen from FIG. 6, the magnetic flux generated by the coil 3 makes a loop by passing through the internal cylinder portion 19g, the internal and external cylinder junction portion 19j, the external cylinder portion 19f, and the external magnetic pole 19a, the clearance surrounding the magnet 1, and the internal magnetic pole 19c and then reaching the internal cylinder portion 19g. Part of the magnetic flux crossing the magnet 1 of the rotor contributes to generating torque.

As can be seen from FIG. 7, the magnetic flux generated by the coil 3 flows through the internal cylinder portion 19g, the internal and external cylinder junction portion 19j, and the external cylinder portion 19f of the second stator 19, and part of the magnetic flux flows from the external cylinder portion 19f to the internal cylinder portion 19g through the coil 3. As can be seen from FIG. 8, part of the magnetic flux flowing from the internal cylinder portion 19g to the external cylinder portion 19f via the internal and external cylinder junction portion 19j joins the magnetic flux flowing through the external cylinder portion 19f shown in FIG. 6, and the summed magnetic flux reaches the external magnetic pole 19a, contributing to the rotation of the rotor.

The magnetic fluxes flowing through the second stator 19 in this way are subject to magnetic saturation at the internal magnetic pole 19c and internal cylinder portion 19g because of their small cross-sectional areas in the magnetic path. Magnetic saturation is alleviated by employing a magnetically soft material such as magnetic SUS series steel or iron for the rotor shaft 7. The rotor shaft 7 functions as a bypass for the magnetic path of the internal magnetic pole 19c and internal cylinder portion 19g. As a result, the magnetic resistance of the entire magnetic path decreases, and the magnetic flux crossing the magnet 1 shown in FIG. 6 increases, heightening the torque of the motor.

Fully controlling magnetic saturation is impossible because a clearance is inevitable between the internal magnetic pole 19c and internal cylinder portion 19g and the rotor shaft 7, and because the cross-sectional area of the rotor shaft 7 needs to be small for miniaturization.

To improve the rotational characteristics of the rotor, the utilization of the magnetic flux needs to be high. For a high magnetic flux utilization, the magnetic flux flowing through the internal magnetic pole 19c, the internal cylinder portion 19g and rotor shaft 7 must cross the magnet 1 as much as possible. To this end, the position of the external cylinder end portion 19h is arranged to be close to the internal and external cylinder junction portion 19j.

The magnetic flux crossing the coil 3 shown in FIG. 7 (this magnetic flux contributes nothing to the rotation of the rotor because it does not cross the magnet 1) is decreased by arranging the external cylinder end portion 19h close to the internal and external cylinder junction portion 19j and thereby by decreasing the facing area between the external cylinder portion 19f and the internal cylinder portion 19g. The magnetic saturation at the internal magnetic pole 19c and internal cylinder portion 19g is thus alleviated. This arrangement increases the magnetic flux flowing through the internal cylinder portion 19g, the internal and external cylinder junction portion 19j, the external cylinder portion 19f, and the external magnetic pole 19a, the clearance surrounding the magnet 1 and the internal magnetic pole 19c and then reaching the internal cylinder portion 19g. Part of the magnetic flux crossing the magnet 1 thus increases. With this arrangement, the inductance of the coil remains unchanged, and torque in a high rotational speed region increases.

By arranging the position of the external cylinder end portion 19h close to the internal and external cylinder junction portion 19j, the magnetic flux flowing through the internal magnetic pole 19c and internal cylinder portion 19g decreases. With the rotor shaft 7 constructed of a magnetically soft material, the magnetic saturation in this area is substantially reduced. The torque characteristic is thus improved even further.

Figure 9:
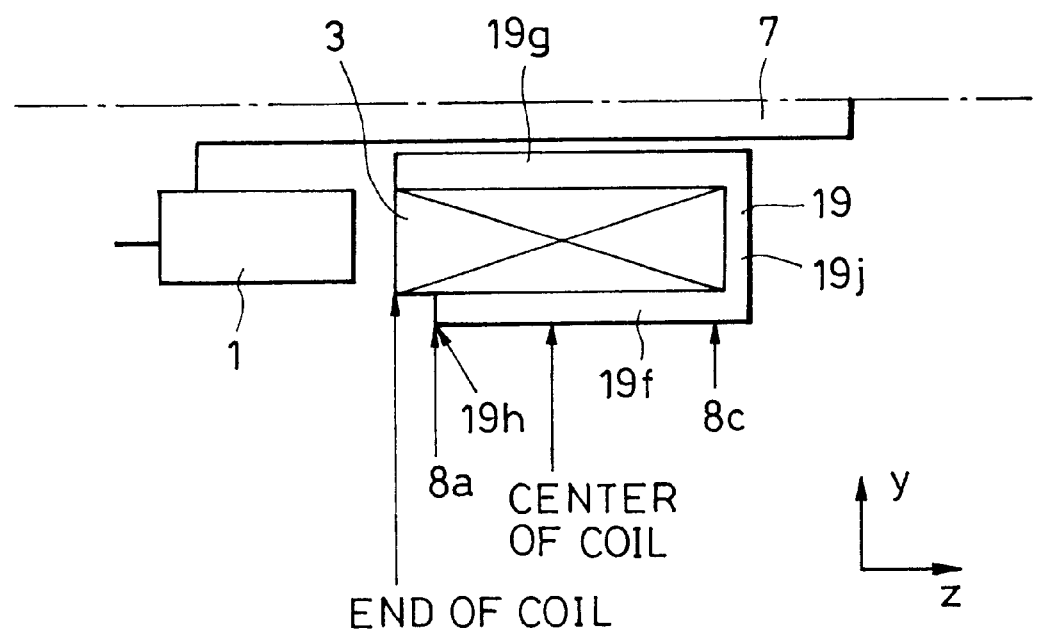
FIG. 9 shows the shape of the stator of the motor shown in FIG. 1.
Figure 10:
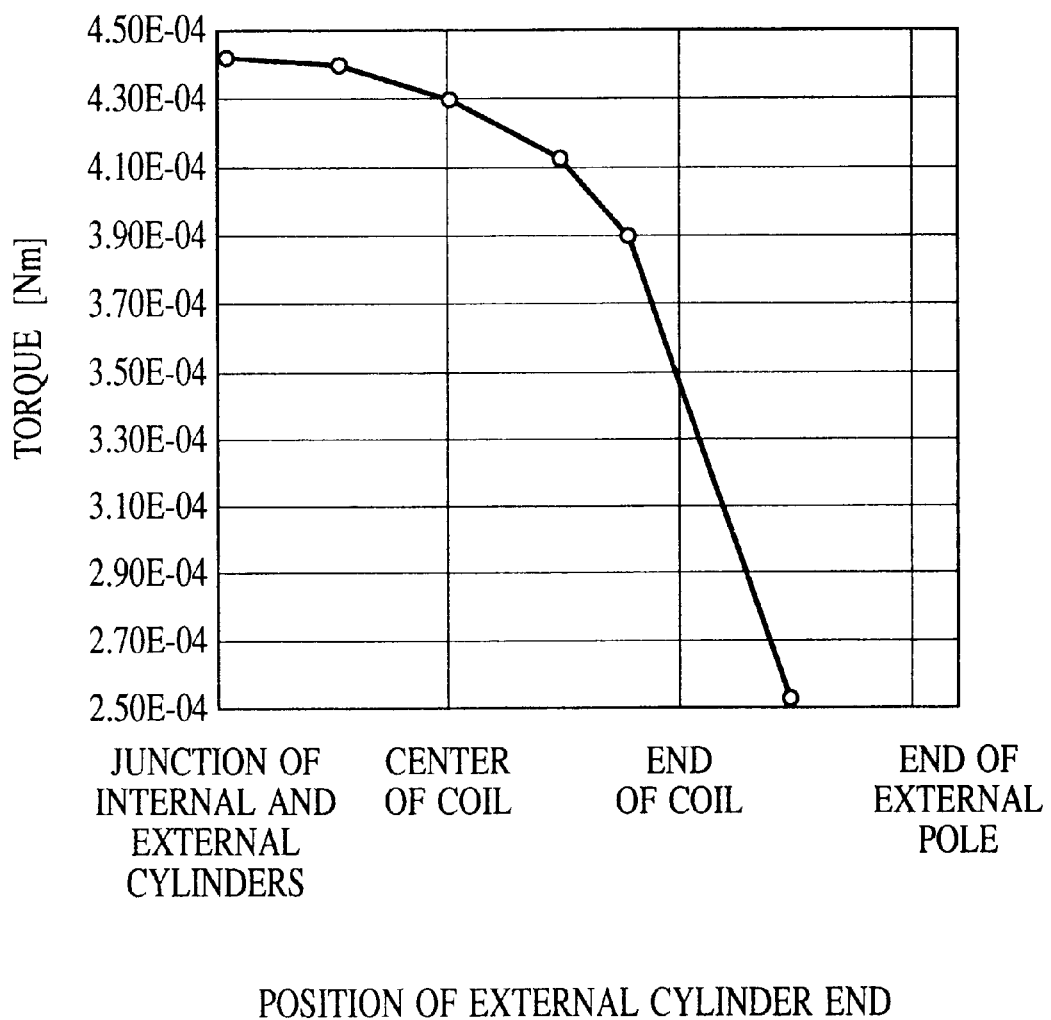
FIG. 10 shows the relationship between the shape of the stator and torque in the motor shown in FIG. 1.
Figure 11:
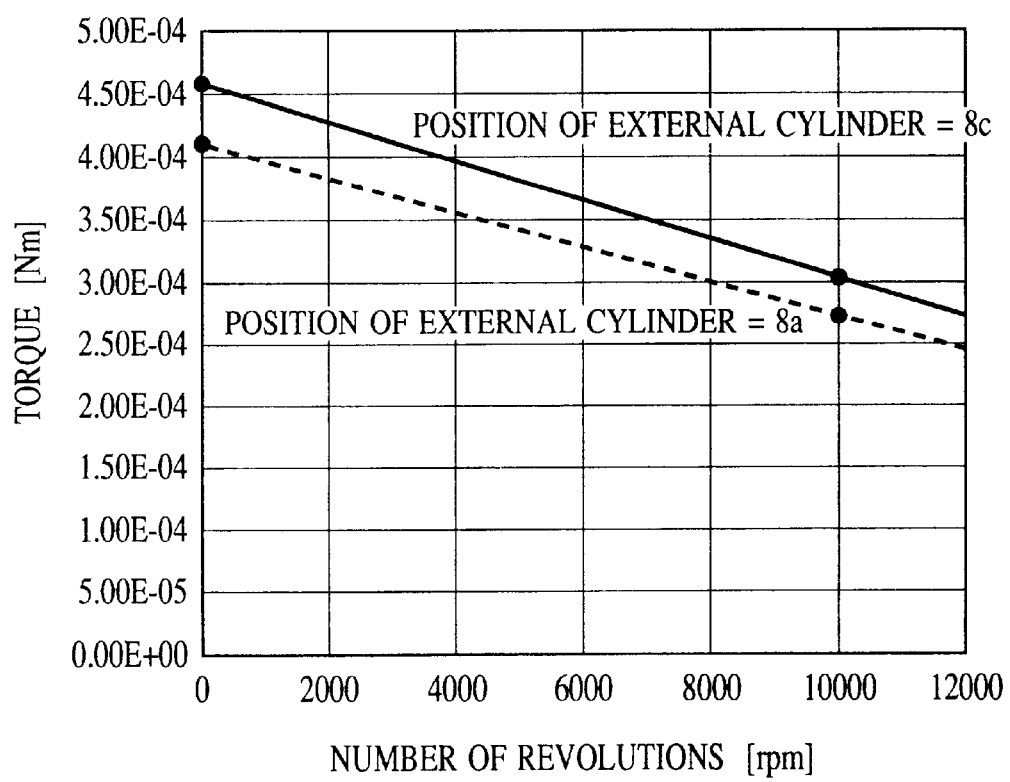
FIG. 11 shows the relationship between the number of revolutions and torque of the rotor when an external cylinder end portion is positioned at positions 8a and 8c in FIG. 9.

FIGS. 9 through 11 show the results of a numerical simulation about the relationship between the position of the external cylinder end portion 19h and torque. FIG. 9 is a sectional view of the motor showing the position of the external cylinder end portion 19h. Referring to FIG. 10, the torque changes when the position of the external cylinder end portion or base 19h is changed from the vicinity of the internal and external cylinder junction portion 19j (8c in FIG. 9) to the center of the coil to the end of the coil. The distance between the internal and external cylinder junction portion 19j and the end of the external magnetic pole 19a is a fixed distance.

FIG. 10 graphically shows the relationship between the position of the external cylinder end portion 19h and the torque of the motor in a low speed rotation. As can be seen from FIG. 10, torque increases as the external cylinder end portion 19h comes close to the internal and external junction portion 19j from the end of the external magnetic pole 19a (the side of the magnet 1). The rate of increase of torque is more noticeable when the external cylinder end portion 19h is between the magnet 1 and the center of the coil. The rate of increase is smaller when the external cylinder end portion 19h is positioned between the center of the coil and the internal and external junction portion 19j. This is because the magnetic flux crossing the second stator 19 tends to make a loop around the coil 3 with scarce magnetic flux crossing the coil 3, particularly in the area extending from the center of the coil 3 to the internal and external junction portion 19j of the coil 3 as shown in FIG. 7.

FIG. 11 is a graph showing the relationship between the number of revolutions per minute and the torque of the motor when the external cylinder end portion 19h is placed at positions of 8a and 8c in FIG. 9. As understood from the above-described reason and from FIG. 11, an increased torque results not only in a low-speed region but also in a high-speed region by placing the external cylinder end portion 19h close to the internal and external junction portion 19j.

From the above discussion, it is understood that the external cylinder end portion 19h is preferably arranged to be close to the internal and external junction portion 19j. In practice, an external cylinder end portion 19h close to the internal and external junction portion 19h lowers the mechanical strength of the second stator 19, adversely affecting the robustness and reliability of the entire motor. In addition, the external cylinder end portion 19h arranged to be close to the internal and external junction portion 19j permits virtually no portion for supporting the external magnetic poles 19a and 19b, making the motor susceptible to a mechanical shock. Although the axially coextensive length of the external magnet poles 19a and 19b with the magnet 1 is an important factor for obtaining a reliable torque, the absence of a portion for supporting the external magnetic poles 19a and 19b conversely varies the axially coextensive length. As a result, the output of the motor becomes unstable. With the external cylinder end portion or base 19h placed in the middle between the coil center and the internal and external junction portion 19j, both torque and mechanical strength requirements are satisfied at the same time.

In the above discussion, the position of the external cylinder end portion 19h is preferably close to the internal and external junction portion 19j. More exactly, the external cylinder end portion 19h is preferably arranged to be close to the outer end of the coil 3 near the internal and external junction portion 19j (in the above embodiment the outer end of the coil 3 and the internal and external junction portion 19j are at the same position).

As understood from the above discussion, changing the position of the external cylinder end portion 19h means defining the facing area between the inner circumference of the external cylinder portion 19f and the outer circumference of the coil 3. The magnetic flux crossing the coil 3 shown in FIG. 7 is controlled by reducing the facing area between the inner circumference of the external cylinder portion 19f and the outer circumference of the coil 3. By reducing the facing area, the torque of the motor is raised.

More specifically, by making the facing area between the inner circumference of the external cylinder portion 19f and the outer circumference of the coil 3 equal to or smaller than three-fourths the outer circumference area of the coil 3, a high-power motor results in the same way as the external cylinder end portion 19h is arranged to be close to the internal and external junction portion 19j.

The position of the external cylinder end portion 19h in the second stator 19 has been discussed. The same is true of the position of the external cylinder end portion 18h in the first stator 18. An experiment was conducted by changing the position of the external cylinder end portion 19h relative to the internal and external junction portion 19j to confirm the above results obtained through numerical simulation. Improvements in torque characteristics shown in the numerical simulation were confirmed in the experiment.

Figure 12:
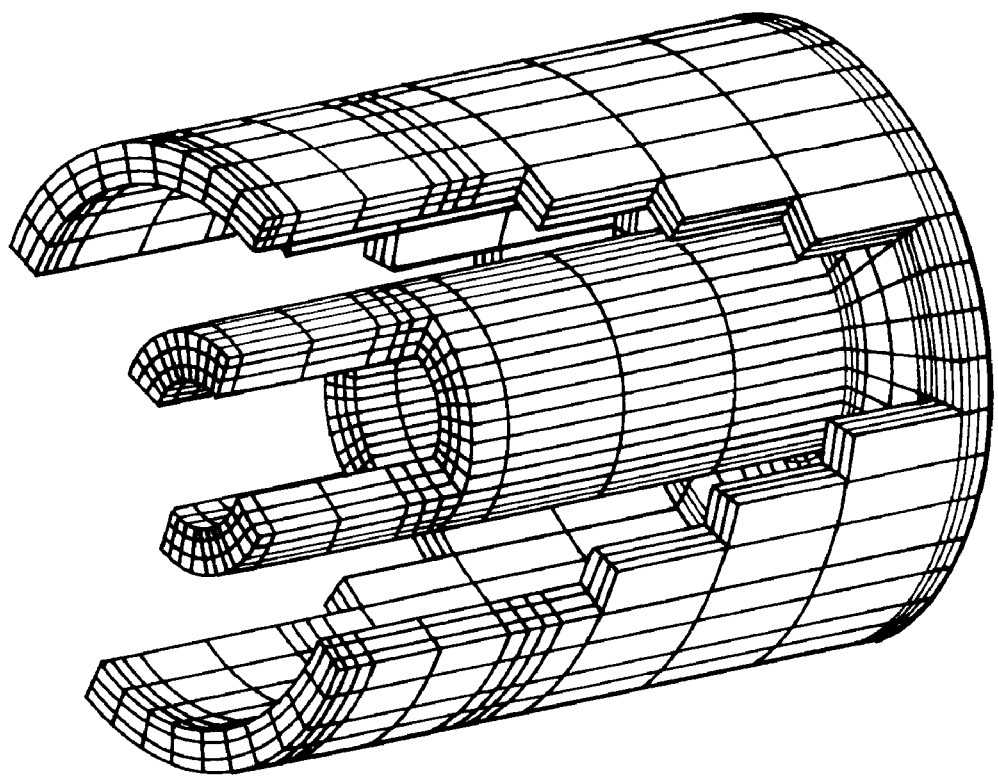
FIG. 12 is a perspective view showing the shape of the stator shown in FIG. 1 of a second embodiment of the present invention.
Figure 13:
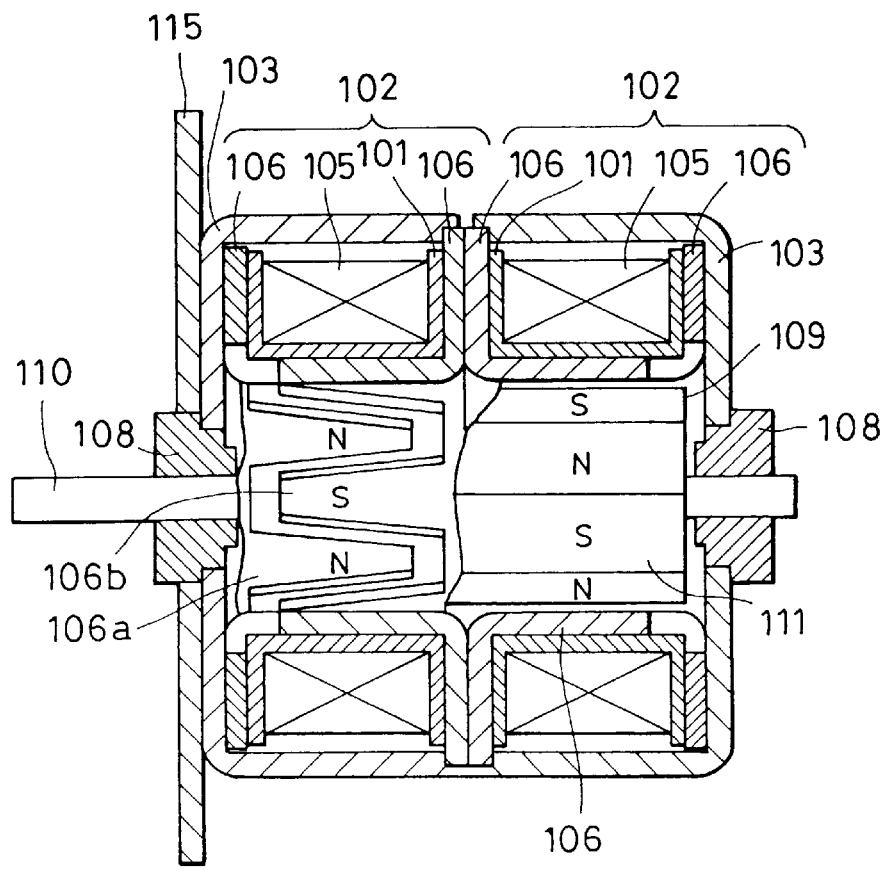
FIG. 13 is a cross-sectional view of a conventional stepping motor.
Figure 14:
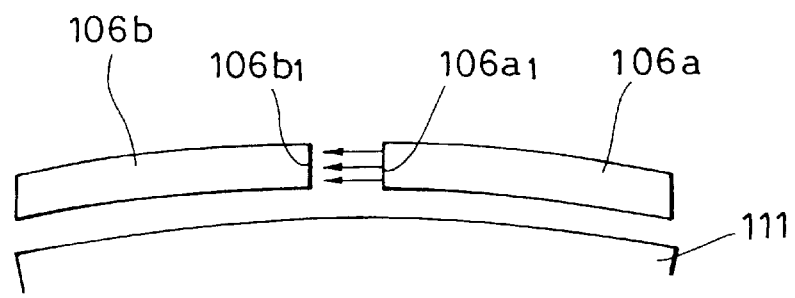
FIG. 14 shows the magnetic flux of the conventional stepping motor of FIG. 13.

Referring to FIG. 12, a second embodiment of the present invention is now discussed.

In the first embodiment, the external cylinder end portion 19h is arranged to be as close as possible to the internal and external junction portion 19j to increase the torque of the motor. As understood from the magnetic field distribution map shown in FIG. 8, part of the external cylinder portion 19f serves as the magnetic path running from the internal and external junction portion 19j to the external magnetic pole 19a.

In the second embodiment, the external cylinder portion 19f is cut to remove its portion through which magnetic flux flows less to the external magnetic pole 19a as shown in FIG. 8. Specifically, the external magnetic pole 19a widens its width dimension across as it runs toward the internal and external junction portion 19j. With this arrangement, the magnetic flux crossing the coil 3 from the external cylinder portion 19f to the internal cylinder portion 19g is restricted, and a magnetic path that efficiently allows the magnetic flux to flow from the internal and external junction portion 19j to the external magnetic pole 19a is formed. The external magnetic poles 19a and 19b support themselves with their wider portions, assuring a sufficient mechanical strength. A high-power torque motor thus results.

As described above, the motor of the present invention comprises the cylindrical magnet divided into n regions circularly around at least the outer circumference of the magnet that are magnetized in alternate polarities, and the first coil and the second coil are arranged in the axial direction of the magnet with the magnet interposed between the first coil and the second coil. The first external magnetic poles and first internal magnetic poles, excited by the first coil, face respectively the external circumference and internal circumference of the rotor at one end of the rotor. The second external magnetic poles and second internal magnetic poles, excited by the second coil, face respectively the external circumference and internal circumference of the rotor at the other end of the rotor. The area of the first external magnetic poles facing the outer circumference of the first coil is equal to or smaller than three-fourths of the area of the outer circumferential surface of the first coil. The area of the second external magnetic poles facing the outer circumference of the second coil is equal to or smaller than three-fourths of the area of the outer circumferential surface of the second coil. With this arrangement, out of the magnetic flux generated by the coil, magnetic flux that makes a loop without reaching the external magnetic poles is reduced while magnetic flux that flows from the external magnetic poles, crossing the magnet and reaching the internal magnetic poles, is increased. The torque of the motor is thus increased.

By constructing the rotor shaft of a magnetically soft material, magnetic saturation in the internal magnetic poles is alleviated and a great deal of magnetic flux is permitted to flow to the internal magnetic poles. With this arrangement, the magnetic flux crossing the magnet as the rotor increases, raising the torque of the motor.

By widening the widths of the first external magnetic poles and the second external magnetic poles as they run toward their base portions, the magnetic resistance, which the magnetic flux generated by the coils and reaching the magnetic poles suffers, is reduced. A great deal of magnetic flux thus flows to the magnetic poles. The magnetic flux crossing the magnet as the rotor increases, raising the torque of the motor.

What is claimed is:

1. An electric motor comprising:
   a cylindrical magnet divided into a number of regions circularly around at least an outer circumference of said magnet that are magnetized in alternate polarities;
   a first coil and a second coil arranged in an axial direction of said magnet, wherein said magnet is interposed between said first coil and said second coil;
   a first external portion excitable by current flowing through said first coil to become a first external magnetic pole, wherein said first external portion faces an outer circumference of said magnet at one side of said magnet, and wherein an area of said first external portion facing an outer circumference of said first coil is equal to or smaller than three-fourths of an area of the outer circumferential surface of said first coil, so as to increase the magnetic flux crossing said cylindrical magnet generated by said first coil;
   a first internal portion excitable by current flowing through said first coil to become a first internal magnetic pole, wherein said first internal portion faces an inner circumference of said magnet at the one side of said magnet;
   a second external portion excitable by current flowing through said second coil to become a second external magnetic pole, wherein said second external portion faces the outer circumference of said magnet at another side of said magnet, and wherein an area of said second external portion facing an outer circumference of said second coil is equal to or smaller than three-fourths of an area of the outer circumferential surface of said second coil, so as to increase the magnetic flux crossing said cylindrical magnet generated by said second coil; and
   a second internal portion excitable by current flowing through said second coil to become a second internal magnetic pole, wherein said second internal portion faces an inner circumference of said magnet at the another side of said magnet.

2. An electric motor according to claim 1, further comprising a rotating shaft rigidly connected to said magnet, wherein said magnet and said rotating shaft together comprise a rotor, and wherein said rotating shaft is made of a magnetically soft material.

3. An electric motor according to claim 1, wherein the widths of said first external portion and said second external portion widen as said first external portion and said second external portion run toward base portions thereof.

4. An electric motor according to claim 1, wherein said first external portion and said first internal portion together comprise a first stator, wherein said second external portion and said second internal portion together comprise a second stator, and wherein said motor further comprises a cylindrical linking member engaging said first external portion and said second external portion.

5. An electric motor according to claim 1, wherein said magnet is divided into a number of regions circularly around an inner circumference thereof that are magnetized in alternate polarities, and wherein each region on the inner circumference is magnetized in a polarity opposite to the polarity of the corresponding region on the outer circumference of said magnet.

6. An electric motor comprising:
   a cylindrical magnet divided into a number of regions circularly around at least an outer circumference of said magnet that are magnetized in alternate polarities;
   a first coil and a second coil arranged in an axial direction of said magnet, wherein said magnet is interposed between said first coil and said second coil;
   a first external portion comprising a first external end portion excitable by a current flowing through said first coil to become a first external magnetic pole, wherein said first external magnetic pole faces an outer circumference of said magnet at one side of said magnet;
   a first external base portion of said first external end portion;
   a first internal portion comprising a first internal end portion excitable by a current flowing through said first coil to become a first internal magnetic pole, wherein said first internal magnetic pole faces an inner circumference of said magnet at the one side of said magnet;

a first junction portion joining said first external and internal portions;

a second external portion comprising a second external end portion excitable by a current flowing through said second coil to become a second external magnetic pole, wherein said second external magnetic pole faces the outer circumference of said magnet at another side of said magnet;

a second external base portion of said second external end portion;

a second internal portion comprising a second internal end portion excitable by a current flowing through said second coil to become a second internal magnetic pole, wherein said second internal magnetic pole faces the inner circumference of said magnet at the another side of said magnet; and a second junction portion joining said second external and internal portions, wherein said first external base portion is positioned between the center of said first coil and the first junction portion opposite to said magnet in the axial direction of said magnet, and wherein said second external base portion is positioned between the center of said second coil and the second junction portion opposite to said magnet in the axial direction of said magnet.

7. An electric motor comprising:

a cylindrical magnet divided into a number of regions circularly around at least an outer circumference of said magnet that are magnetized in alternate polarities;

a first coil and a second coil arranged in an axial direction of said magnet, wherein said magnet is interposed between said first coil and said second coil;

a first external portion comprising a first external end portion excitable by a current flowing through said first coil to become a first external magnetic pole, wherein said first external magnetic pole faces an outer circumference of said magnet at one side of said magnet;

a first external base portion of said first external end portion;

a first internal portion comprising a first internal end portion excitable by a current flowing through said first coil to become a first internal magnetic pole, wherein said first internal magnetic pole faces an inner circumference of said magnet at the one side of said magnet;

a second external portion comprising a second external end portion excitable by a current flowing through said second coil to become a second external magnetic pole, wherein said second external magnetic pole faces the outer circumference of said magnet at another side of said magnet;

a second external base portion of said second external end portion;

a second internal portion comprising a second internal end portion excitable by a current flowing through said second coil to become a second internal magnetic pole, wherein said second internal magnetic pole faces the inner circumference of said magnet at the another side of said magnet;

wherein said first external base portion is positioned between a center of said first coil and an end of said first coil opposite to said magnet in the axial direction of said magnet, and wherein said second external base portion is positioned between a center of said second coil and an end of said second coil opposite to said magnet in the axial direction of said magnet.

8. An electric motor comprising:

a cylindrical magnet divided into a number of regions circularly around at least an outer circumference of said magnet that are magnetized in alternate polarities:

a first coil and a second coil arranged in an axial direction of said magnet, wherein said magnet is interposed between said first coil and said second coil;

a first external portion excitable by a current flowing through said first coil to become a first external magnetic pole, wherein said first external portion faces the outer circumference of said magnet at one side of said magnet, and wherein an area of said first external portion facing the outer circumference of said first coil is equal to or smaller than three-fourths of an area of an outer circumferential surface of said first coil, so as to increase the magnetic flux crossing said cylindrical magnet generated by said first coil;

a first internal portion excitable by a current flowing through said first coil to become a first internal magnetic pole, wherein said first internal portion faces an inner circumference of said magnet at the one side of said magnet, wherein said first external and internal portions together comprise a first stator;

a second external portion excitable by a current flowing through said second coil to become a second external magnetic pole, wherein said second external portion faces the outer circumference of said magnet at another side of said magnet, and wherein an area of said second external portion facing the outer circumference of said second coil is equal to or smaller than three-fourths of an area of an outer circumferential surface of said second coil, so as to increase the magnetic flux crossing said cylindrical magnet generated by said second coil; and a second internal portion excitable by a current flowing through said second coil to become a second internal magnetic pole, wherein said second internal portion faces the inner circumference of said magnet at the another side of said magnet, and wherein said second internal and external portions together comprise a second stator.

9. An electric motor according to claim 8, wherein said first stator is integrally formed of said first external portion and said first internal portion, and wherein said second stator is integrally formed of said second external portion and said second internal portion.

10. An electric motor according to claim 8, further comprising a rotating shaft rigidly connected to said magnet, wherein said magnet and said rotating shaft together comprise a rotor, and wherein said rotating shaft is made of a magnetically soft material.

11. An electric motor according to claim 8, wherein the width of said first external portion and said second external portion widen as said first external portion and said second external portion run toward base portions thereof.

* * * * *

UNITED STATES PATENT AND TRADEMARK OFFICE
CERTIFICATE OF CORRECTION

PATENT NO. : 6,046,517
DATED : April 4, 2000
INVENTOR(S) : Toyoshige Sasaki, et al.

It is certified that error appears in the above-identified patent and that said Letters Patent is hereby corrected as shown below:

ON THE COVER PAGE:
At [56] References Cited:
AT U.S. PATENT DOCUMENTS:

Insert --5,339,098      8/1994  Nagatomo et al. 395/12--.

FOREIGN PATENT DOCUMENTS:

Insert --0 471 545      2/1992  Europe.
         580 165 A1     1/1994  Europe.
         454 155 A2     4/1991  Europe.--
"409 289 767    11/1997" should read --9-289767  11/1997--.

ON THE COVER PAGE:
At [56] References Cited:
AT OTHER PUBLICATIONS:

Insert --Patent Abstract of Japan, Vol. 16, No 161, April 20, 1992.
        English Abstract of Japanese Patent No. 4-10942.
        Patent Abstract of Japan, Vol. 16, No. 161, April 20, 1992.
        English Abstract of Japanese Patent No. 4-10940.--.

UNITED STATES PATENT AND TRADEMARK OFFICE
CERTIFICATE OF CORRECTION

PATENT NO. : 6,046,517
DATED : April 4, 2000
INVENTOR(S) : Toyoshige Sasaki, et al.

It is certified that error appears in the above-identified patent and that said Letters Patent is hereby corrected as shown below:

<u>Column 2</u>:
Line 18, "Into" should read --into--.
Line 66, "achieve" should read --achieves--.

Signed and Sealed this

Nineteenth Day of June, 2001

*Attest:*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO.    : 6,046,517
DATED         : April 4, 2000
INVENTOR(S)   : Toyoshige Sasaki et al.

It is certified that error appears in the above-identified patent and that said Letters Patent is hereby corrected as shown below:

<u>Title page, below Item [73],</u>
Delete "[*] Notice: This patent is subject to a terminal disclaimer."

Signed and Sealed this

Twenty-fifth Day of December, 2001

*Attest:*

JAMES E. ROGAN
*Attesting Officer*  *Director of the United States Patent and Trademark Office*